May 15, 1951 H. V. HANSEN 2,553,315
HITCH FOR GRAIN DRILLS
Filed March 8, 1945 4 Sheets-Sheet 1
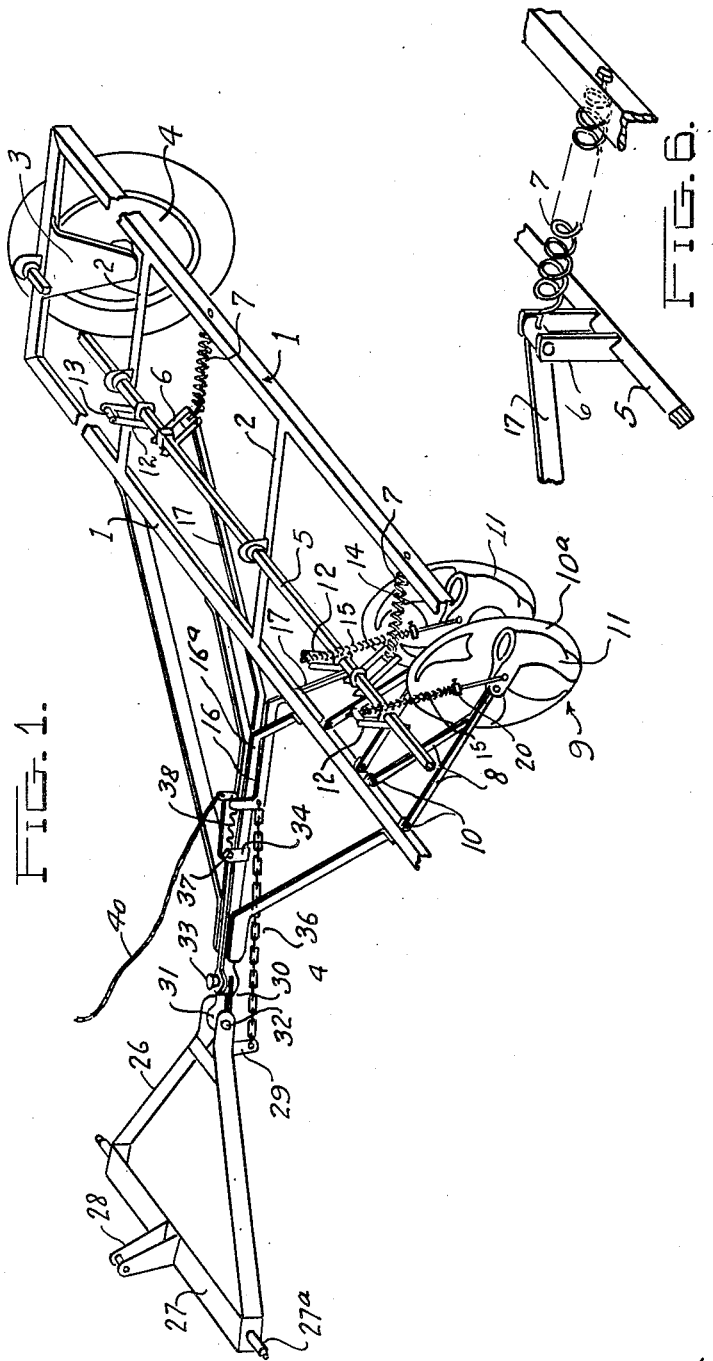
INVENTOR.
Harold V. Hansen
BY
Barnes, Kisselle, Laughlin & Raisch
Attorneys

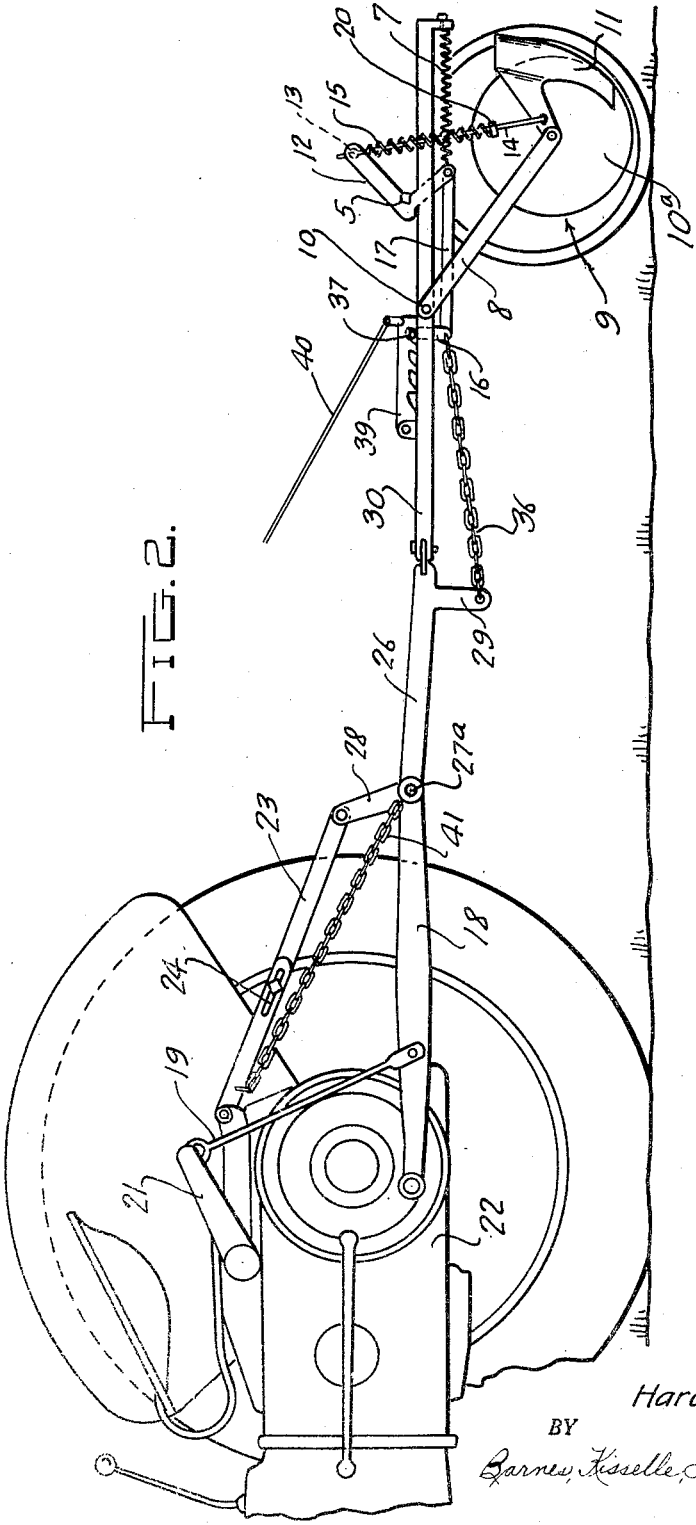

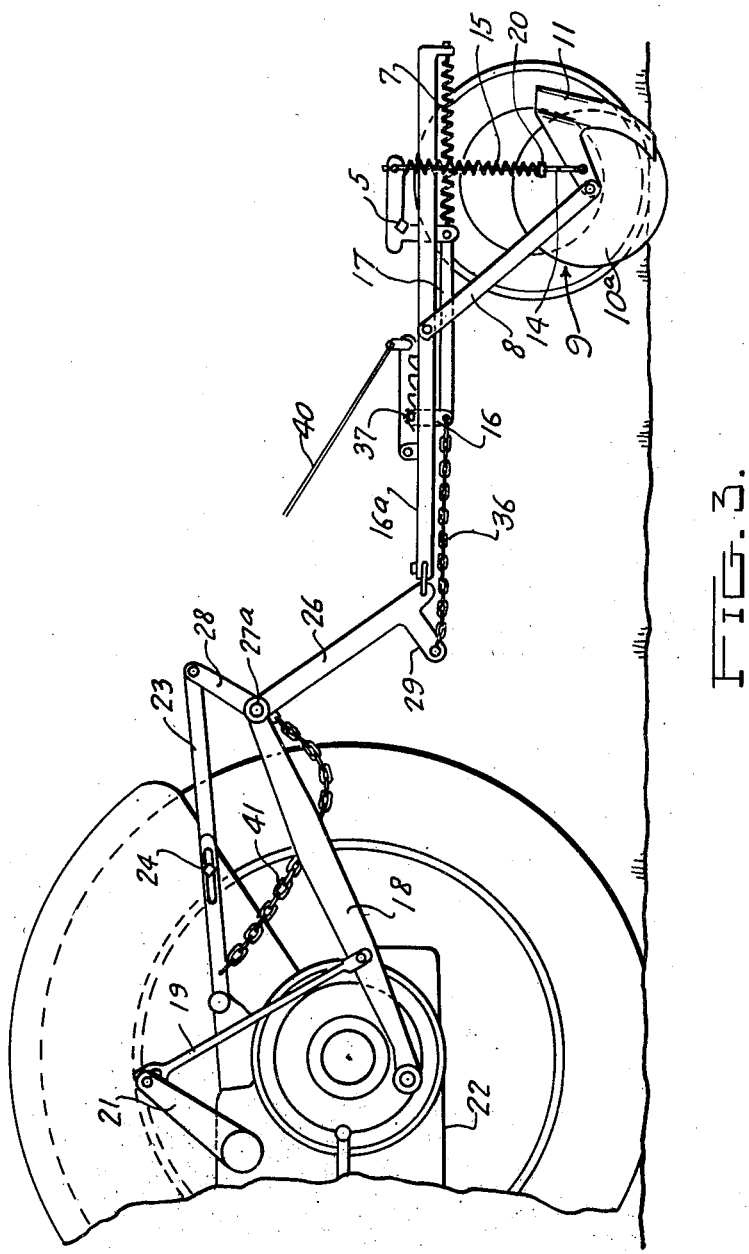

May 15, 1951  H. V. HANSEN  2,553,315
HITCH FOR GRAIN DRILLS
Filed March 8, 1945  4 Sheets-Sheet 4
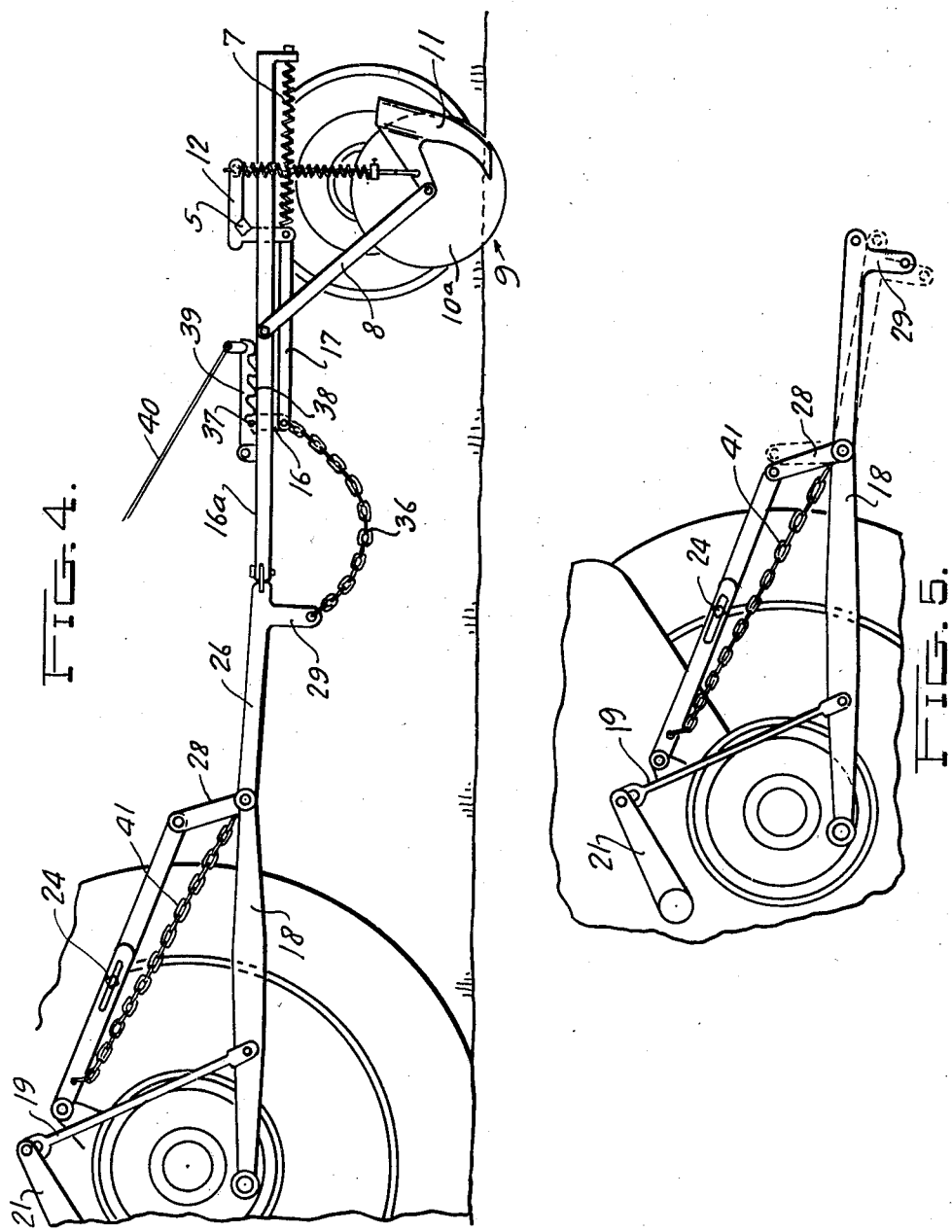
INVENTOR.
Harold V. Hanson
BY
Barnes, Kisselle, Laughlin & Raisch
Attorneys Patented May 15, 1951

2,553,315

UNITED STATES PATENT OFFICE 2,553,315

HITCH FOR GRAIN DRILLS

Harold V. Hansen, Dearborn, Mich., assignor to Harry Ferguson, Inc., Dearborn, Mich., a corporation of Delaware Application March 8, 1945, Serial No. 581,587

10 Claims. (Cl. 97—47)

This invention relates to a hitch means for connecting an agricultural implement or the like to a tractor, and more particularly to a hitch especially adaptable for use with such implements as grain drills and the like which may be said characteristically to embody a part or parts that in the control of the operation of the implement are shiftable into and out of a predetermined position or positions.

Certain types of tractors embody vertically movable power actuating means which may be utilized for implement control. For example, the type of tractor shown in Ferguson Patent No. 2,118,180 includes, among other things, a hydraulic power lift that acts through an implement hitch and may be used to control the position of a movable implement part in addition to providing a draft connection.

In certain types of implements one or more parts are mounted for movement into and out of some operative position, which position may be one wherein the part or parts operatively engage the ground. In grain drills, for instance, ground opening and seed placing means such as disc and seed boot or shoe assemblies are mounted on a supporting frame for movement into and out of ground engagement, the assemblies usually being spring urged in one direction or the other. Such implements are rather frequently shifted between their operative and inoperative positions and since the depth of penetration of the ground opening discs is a factor in the proper operation of the implements, uniformity in the adjustment and control of the depth of penetration is important. In such implements, moreover, the relationship of the disc and seed boot assemblies with respect to the ground may be changed by varying the vertical distance of the implement tongue or draft member from the ground. Consequently, this distance once predetermined for any given condition should remain unchanged.

A general object of the invention, therefore, is to provide for agricultural implements and tractors of the character above set forth, a new and improved hitch means for connecting the draft member of the implement and the power lift of the tractor which will be operative by the vertical movement of the power lift to effect movement of the implement parts to be controlled without varying the height of the implement draft member as a result of such lift movement.

Another object of the invention is to provide new and improved means by which a grain drill or comparable implement of the type above characterized may be connected to the tractor hitch in trail-behind relation so that in operation the relationship of the planting assemblies to the ground may be changed by vertical adjustment of the hitch and the controlled shifting movement of the planting assemblies into ground engaging relation may be effected by the power actuated vertical movement of the hitch without disturbing or affecting such predetermined relationship.

Another object of the invention is to provide a new and improved hitch for connecting a grain drill or comparable implement with the tractor whereby a power operated lift on the tractor will be operative to move the shiftable parts on the implement from a position into which such parts are resiliently urged to a selected position in which the parts are latched to permit of subsequent independent movement of the lift.

Other objects and advantages of the invention will be apparent from the following detailed description taken in connection with the accompanying drawing, in which Fig. 1 is a perspective, somewhat diagrammatic, view showing a portion of a grain drill and my improved hitch and coupling for operating the parts on the grain drill or similar implement.

Fig. 2 is a side elevation of the same members showing the attachment to the tractor and showing the ground opening discs and the seed boots in elevated position.

Fig. 3 is a similar view showing the ground opening discs and the seed boots in working position in the ground, but the hitch and the draft links not in normal position.

Fig. 4 is a similar view showing the hitch lowered to the normal draft position, the discs and seed boots being latched in the position to which they have been shifted.

Fig. 5 shows how, by altering the length of the hitch upper link, the normal position of the draft bar may be altered.

Fig. 6 is a detail view showing a modification.

While the invention is susceptible of various modifications and alternative constructions and uses, I have shown in the drawings and will herein describe in detail the preferred embodiment of the invention. It is to be understood, however, that I do not intend to limit the invention by such disclosure but mean to cover all modifications and alternative constructions and uses falling within the spirit and scope of the invention as expressed in the appended claims.

Referring now to the drawings, 1 designates a frame having reinforcing cross pieces 2 and end brackets 3 supporting ground engaging wheels 4. A cross shaft 5 is rockably supported by the frame, and at spaced points the rock shaft has one or more lever arms 6 rigid therewith (two lever arms being herein shown). An extension spring 7 bears between the lever arm and the frame to urge the rock shaft in one direction. As shown in Fig. 1, the arrangement is such that the spring 7 urges the rock shaft 5 counterclockwise when the apparatus is viewed from the lower left-hand corner of the drawing. But with the arms 6 pointing upwardly, as shown in Fig. 6, the spring will urge the shaft clockwise.

At spaced intervals along the frame are bracket members 8 for individually connecting the planting disc and seed boot assemblies to the front frame member 1. These connections are pivoted to the front frame member, as at 10, for vertical movement. Each planting assembly 9 includes a disc 10a for opening the ground and a tubular shoe or boot 11 into which the seeds are dropped by a suitable feed box or seed feeding attachment (not shown). For each planting assembly there is a lever 12 which is rigid with the rock shaft 5. Each lever has spaced ears at its outer end between which a swinging cross piece 13 is mounted slidably to receive a rod 14. The lower end of the rod is connected with a planting assembly and a spring 15 encircling the rod bears between the cross piece 13 and an adjustable collar 20 on the rod. This spring and its associated parts usually hold each planting assembly in extended relation in respect to the frame, but permit the discs to ride upwardly over an obstacle encountered during use.

The planting assemblies are simultaneously raised and lowered by rotation of the rock shaft 5. As mentioned, the movement of the shaft in one direction is caused by springs 7. To move the shaft in the opposite direction an actuator or slide 16 straddling a part of a substantially horizontal hitch member or implement tongue 16a has diverged arms 17 which extend rearwardly and are connected with the lever arms 6. Thus a forward movement of the slide pulls on the arm 6 to rock shaft 5 against the tension of springs 7. This movement rocks the planting assemblies downwardly into ground engagement and the extent of movement determines the distance to which the discs are actually pulled into the ground. If the lever arms 6 extend upwardly from the rock shaft the forward movement of the slide will pull the planting assemblies out of the ground up to an elevated, transport position. This modification is shown in Fig. 6.

This forward adjustment of the slide 16 is accomplished by means of the tractor hitch links. These include lower links 18 which can be raised and lowered by the drop links 19 that in turn are raised by the crank arms 21. These crank arms 21 may be controlled by a hydraulic mechanism embodied in the transmission case 22, such as that described and claimed in Ferguson Patent No. 2,118,180 referred to earlier herein. This hitch has a single upper compression link 23 made up of two sections connected by a bolt and slot connection 24 which permits the altering of the length thereof.

The implement is connected to the tractor hitch links by an intermediate hitch member 26 which, as shown in Fig. 1, is a triangular frame made up of the side bars connected by a horizontal cross bar 27 having endwise extending pins 27a arranged for connection with universal ball and socket joints on the lower links. In the center of the cross bar 27 is a rigid extension in the form of a pair of upstanding arms 28 which are connected with the upper compression link 23. The rear end of the frame 26 is provided with a rigid extension in the form of a depending arm 29 which acts as a bell crank, having its lower end connected by a chain or the like 36 with the slide 16. The intermediate hitch member 26 and the horizontal hitch member or tongue 16a which are intermediate the tractor and the implement proper are joined by a suitable universal connection, which is shown in detail in Fig. 1 at 30. This comprises a clevis 31 fastened to the frame 26 by horizontal pivot 32 and fastened to the tongue 16a of the grain drill by a vertical pivot 33.

It will be noted (see Fig. 2) that with the hitch links 18 in their lowermost position as determined by the link check chain 41, adjustment of the length of the upper link (by the bolt and slot connection 24) will change the vertical position of the universal connection 30, with a corresponding change in the position of the front end of the implement tongue. Inasmuch as the implement is supported by a pair of transversely spaced ground wheels, located a substantial distance behind the pivotal points about which the disc and seed boot assemblies swing toward and away from the ground, the vertical position of the implement tongue will fix the operative relationship between the disc and seed boot assemblies with the ground. Thus, if the front end of the implement tongue 16a is too low, the relationship of the disc and the open mouth of the boot with respect to the soil would be such that the disc would be too deep and the boot too shallow. The seeds would consequently be planted at insufficient depth. Conversely, if the front end of the tongue is too high, the relationship of the parts of the assembly would cause the open mouth of the seed boot to be too deep in the soil and to face slightly forwardly in the direction of implement movement. In this condition the seed boot would quickly fill with soil.

It is accordingly important to the proper operation of the implement that once a correct relationship of the disc and seed boot assembly to the soil has been reached by locating the front end of the implement tongue at a proper height with respect to the ground, such relationship should remain undisturbed during the operation of the implement. The arrangement of the connecting member 26 between the hitch links and the implement tongue is effective to maintain this relationship while permitting of vertical movement of the hitch links to control the operative condition of the implement.

To place the planting disc and the seed boot in working position, the hydraulic mechanism (not shown) on the tractor is operated to lift the hitch from the position shown in Fig. 2. During this upward movement, the frame 26 pivots relative to the links about the pins 27a and relative to the implement tongue about the universal connection 30. The parts are so arranged and dimensioned that these pivotal movements take place without vertical movement of the front end of the implement tongue 16a. The vertical hitch movement in causing the connecting frame 26 to assume the position shown in Fig. 3, swings the arm 29 forwardly as the frame pivots at the universal connection 30, and this through a one-way acting flexible member in the form of chain 36 pulls forward on the slide 16. The slide includes a transversely disposed pin 37 which rides on the top of the implement tongue and under teeth 38 of a ratchet arm or latch 39 pivoted at its forward end on the upper part of the tongue. This ratchet arm is a plural-toothed latch and is held in position for engagement with the pin 37 by gravity.

It will be seen that the tractor hitch may be raised the whole distance, as shown in Fig. 3, or only part way, and that the planting disc and boot assembly will be locked in each position by the teeth of the latch bar as the hitch causes the slide 16 to move forward. It will be locked in this position against the stress of the spring 7 which is tending to lift the disc and seed boot assembly. After the disc and boot have been drawn down to the desired position in the ground, the lifting power can be discontinued and the hitch may be dropped down to the predetermined position determined by the chain 41 (see Fig. 4). If it is desired to raise the planting disc and boot assembly, all that is necessary is to raise the latch 39 to release the slide 16; spring 7 will then immediately return the disc and boot assembly to the upper position, shown in Fig. 2, which is the normal position for transport. The latch may be released by a pull on cord 40 and the release may be facilitated by first raising the hitch until the slide is freed from the latch. Subsequent lowering of the hitch with the latch lifted will restore the parts of their inoperative condition (Fig. 2).

As stated above, the spring 7 can be used for normally keeping the boot assembly in a downward position by attaching the spring to upwardly extending arms on the shaft 5 (see Fig. 6) so that it tends to rotate the shaft clockwise when viewed from the left. In this arrangement, the hitch and the draft frame would be used for just the reverse movement of raising the disc and boot assembly to any one of the intermediate positions or the final position of transport. The latching bar and slide would be used in precisely the same way except that the movements of the spring and the hitch would have just the opposite effects on the movement of the disc and seed boot assembly.

In either arrangement it will be evident that the vertical movement of the hitch will be effective to draw the implement part to be controlled to a desired position and there latch it against return by the force of a restoring spring and that the operation will be accomplished without affecting the predetermined relationship of the implement to the soil.

What I claim is:

1. In an implement-controlling hitch for connecting an implement having a positionable member thereon to a tractor having upper and lower trailingly pivoted draft links and having power-operated means for elevating the links, the combination comprising a generally horizontal member adapted for connection to said implement in forward extending relation therefrom, an intermediate hitch member having a forward end portion pivotally connectible at vertically spaced points to the trailing ends of said links respectively and having a rearward end portion pivotally connectible to said horizontal member, the points of connection between said forward end portion of said intermediate member and the tractor links being spaced so that rotation of said intermediate member relative to said horizontal member can occur in response to elevation of said tractor links without elevation of said trailing end of said intermediate member, a slide on said horizontal member, said slide being adapted for connection with the positionable member of said implement, a bell crank on said intermediate member, and a one-way acting flexible member for movably connecting said intermediate member with the slide on said horizontal member.

2. In an implement controlling hitch for connecting an implement having a positionable member thereon to a tractor having upper and lower trailingly pivoted draft links and having power-operated means for elevating the links, the combination comprising a generally horizontal member adapted for connection to said implement extending forwardly therefrom, an intermediate hitch member pivotally connectible at its forward end at vertically spaced pivot points to the trailing ends of said links respectively and pivotally connected at its rear end to said horizontal member, the points of connection to the tractor links being so arranged that elevation of the latter causes a lifting of the forward end but not of the rear end of said intermediate hitch member to produce bodily rotation thereof, a slide on said horizontal member, said slide being adapted for connection with the positionable member of said implement, means including a bell crank on said intermediate member and an actuating chain for movably connecting said intermediate member with the slide on said horizontal member, and a manually-releasable ratchet on said horizontal member for cooperating with said slide to retain it in a selected position.

3. An intermediate hitch member for connecting a tractor having a trailing power-elevated draft link and a compression link trailingly pivoted to the rear end thereof with an implement having a draft connection thereon comprising, in combination, a body portion arranged generally horizontally between said tractor and said implement, forward connecting means at the forward end of said body portion for connection to the trailing ends of the links, a draft connection at the rear end of said body portion for attachment to the implement, said forward connecting means being constructed and arranged so as to permit rotation of said intermediate hitch member upon elevation of said links with the implement draft connection maintained at a predetermined level.

4. An intermediate hitch member for connecting an implement having a draft connection to a tractor having a trailingly pivoted power-elevated draft link and a trailingly pivoted compression link mounted above it comprising, in combination, a body portion having a pivot connection at its forward end for engaging said lower link, a second portion rigid with said body portion and extending generally upwardly from the forward end thereof and including a pivot connection for engaging the compression link, and means at the rear end of said body portion for attachment to the draft connection of the implement, the point of engagement of said compressive link being so related to the point of engagement of said lower link and so related to the length of the links on the tractor that the point of attachment of the implement will remain at a substantially constant level independent of the degree of elevation of the links on said tractor.

5. An intermediate hitch member for connecting an implement and a shiftable member thereon to a tractor having a trailingly pivoted power-elevated draft link mounted for generally vertical swinging movement within a predetermined range and a trailingly pivoted compression link also mounted for generally vertical swinging movement above said draft link, said intermediate hitch member comprising, in combination, a body disposable in trailed relation with said draft link and having a pivot connection therewith, an arm rigid with said body and having a pivot connection for engaging the compression link, means at the rearward end of said body for pivotal attachment to the draft connection of the implement in a manner permitting of relative rotation between said intermediate hitch member and said draft member, said means being located at a predetermined point on said body and which is adapted to remain at a substantially constant level for any condition of elevation of said draft link within said predetermined range, an extension rigid with the rearward end portion of said body, a flexible force transmitting member disposable between said extension and the shiftable member of said implement, said force transmitting member being adapted to actuate the shiftable member in response to relative rotation between said intermediate hitch member and said draft member.

6. In a hitch for connecting a tractor with an implement such as a grain drill having a draft member and characterized by having parts movable into and out of a predetermined operating position, the tractor having a vertically movable power actuated draft link and a vertically movable compression link trailingly pivoted on the rear end thereof, the combination comprising an intermediate hitch frame adapted for connection with and relative movement with respect to the tractor links and the implement draft member, said frame having a forward end portion pivotally connectible with the tractor links at vertically spaced points, said frame having a rearward end portion pivotally connectible with said implement draft member, said intermediate hitch frame also being adapted to permit substantial vertical movement of said tractor links unaccompanied by a corresponding vertical movement of the implement draft member, and arm means on the rearward end portion of said intermediate hitch frame connectible with the movable parts on the implement for shifting them from one position to another during the aforesaid relative movement of said intermediate hitch means.

7. In an implement controlling hitch for connecting a tractor having a trailed compression link and a power-elevated draft link with an implement having a positionable member for controlling the operation thereof, the combination comprising a draft tongue adapted for connection to said implement in forward projecting relation with respect thereto, an intermediate hitch member for interconnecting the tractor draft link and the forward end of said draft tongue, an extension on said intermediate hitch member for allowing it to be inclined upwardly upon elevation of the tractor draft link without corresponding elevation of the draft tongue, said extension being pivotally connectible to the compression link at a point spaced vertically from the connection of said intermediate hitch member with said draft link, force transmitting means for connecting said intermediate hitch member with the positionable member on said implement to permit movement of the positionable member upon inclining of said intermediate hitch member, and latch means on said draft tongue for maintaining said positionable member in a displaced position.

8. In an implement controlling hitch for connecting a tractor having power-elevated draft links and a vertically spaced compression link with an implement having a positionable member thereon, the combination comprising a draft tongue adapted for connection to said implement and in forward projecting relation with respect thereto, an intermediate hitch member for interconnecting the tractor draft links and the forward end of said draft tongue, vertically spaced pivotal connections on said intermediate hitch member, one of said connections being susceptible of attachment to said draft links, the other of said connections being susceptible of attachment to said compression link, the spacing of said connections being such as to allow said intermediate hitch member to be inclined progressively upwardly upon elevation of said draft links without corresponding elevation of said draft tongue, force transmitting means for connecting said intermediate hitch member with the positionable member on said implement to permit movement of the positionable member upon inclining of said intermediate hitch member, and means including a manually releasable ratchet on said draft tongue for maintaining said positionable member in a displaced position.

9. An intermediate hitch member for coupling an implement having a draft connection and a positionable member to a tractor having a trailing draft link and a trailing compression link mounted above it and power operated means for elevating the links comprising, in combination, a body portion, means including vertically spaced pivots at the forward end of said body portion for connection to said tractor links respectively, means including a pivot at the rear end of said body portion for engaging the implement draft connection, said pivots being oriented so as to permit upon elevation of said links bodily rotation of the intermediate hitch member in a direction tending to keep the draft connection of said implement at a substantially constant level, a bell crank rigid with said body portion, and flexible force transmitting means for connecting said bell crank with the positionable member on the implement and for actuation of said positionable member upon elevation of said links.

10. An intermediate hitch member for coupling an implement having a draft connection and a positionable member thereon to a tractor having trailing draft links and a trailing compression link mounted above them and power operated means for elevating the draft links comprising, in combination, a body portion, means including vertically spaced pivots at the forward end of said body portion for connection to said draft and compression links respectively, said pivots being oriented so as to permit upon elevation of said links rotation of said body portion in a direction tending to maintain the rear end thereof at a substantially constant level, and arm means rigid with said body portion for moving the positionable member of said implement in response to rotation of said body portion, and coupling means at the rear end of said body portion for attachment of said implement draft connection in a manner allowing relative universal movement of the implement.

HAROLD V. HANSEN.

REFERENCES CITED

The following references are of record in the file of this patent:

UNITED STATES PATENTS

| Number | Name | Date |
|---|---|---|
| 1,637,811 | Ferguson | Aug. 2, 1927 |
| 1,748,393 | Peterson | Feb. 25, 1930 |
| 2,278,006 | Waltke | Mar. 31, 1942 |
| 2,413,807 | Warne | Jan. 7, 1947 |

FOREIGN PATENTS

| Number | Country | Date |
|---|---|---|
| 556,859 | Great Britain | Oct. 26, 1943 |